(12) United States Patent
Gomez et al.

(10) Patent No.: US 9,032,047 B1
(45) Date of Patent: May 12, 2015

(54) VIDEO SHARING NETWORK

(76) Inventors: Troy Gomez, Covingon, LA (US);
Sebastiaan Elzinga, Heerenveen (NL)

( * ) Notice: Subject to any disclaimer, the term of this patent is extended or adjusted under 35 U.S.C. 154(b) by 375 days.

(21) Appl. No.: 13/067,313

(22) Filed: May 24, 2011

Related U.S. Application Data

(60) Provisional application No. 61/344,099, filed on May 24, 2010.

(51) Int. Cl.
*G06F 15/16* (2006.01)
*H04L 29/06* (2006.01)
*H04N 21/258* (2011.01)

(52) U.S. Cl.
CPC ........ *H04L 65/605* (2013.01); *H04N 21/25825* (2013.01)

(58) Field of Classification Search
CPC .................... H04N 21/25825; H04N 21/2662; H04N 21/6582; H04N 21/2547; H04N 21/2381; H04N 21/00; H04N 21/258; H04L 21/5825; H04L 65/605

USPC ......................................................... 709/219
See application file for complete search history.

(56) References Cited

U.S. PATENT DOCUMENTS

| | | | |
|---|---|---|---|
| 2002/0087543 A1* | 7/2002 | Saitou et al. ..................... 707/9 |
| 2006/0291463 A1* | 12/2006 | Ishii ............................. 370/389 |
| 2007/0099658 A1* | 5/2007 | Borquez et al. ............ 455/556.2 |
| 2009/0248794 A1* | 10/2009 | Helms et al. .................. 709/203 |
| 2010/0061316 A1* | 3/2010 | Levenshteyn et al. ........ 370/329 |
| 2010/0312851 A1* | 12/2010 | Jackson et al. ................ 709/217 |
| 2010/0325155 A1* | 12/2010 | Skinner et al. ................ 707/770 |

* cited by examiner

*Primary Examiner* — Tom Y Chang

(57) ABSTRACT

The present invention is directed to a social networking system which provides a website for users to share personal videos made by each user's web cam. Videos are shared over the interne through the use of open source technology which uses cryptography to search, locate and convert video for passing the video to any type of video device for playback and recording. A matching server is used to determine each user's type of video service.

6 Claims, 9 Drawing Sheets

Step #2 – VIDEO LAUNCHING PROCESS

VIDEO SHARING NETWORK

BACKGROUND OF THE INVENTION

This invention relates generally to a video sharing network, and more particularly to a video sharing network which permits members of a network to register a particular portable media device with a website in order to view video created from different operating systems.

The popularity of small video cameras for use with personal computers has been increasing. Such video cameras are sometimes referred to as netcams or webcams. These types of devices connect to the Universal Serial Bus (USB) or other port of a computer, and enable users to record or stream video and audio into the computer. Popular applications of such cameras include small-scale video communications, live transfer of video onto a web site, as well as other applications.

Unfortunately, transferring video through a website, such as a dating website is useless unless all the potential parties have compatible equipment. Net cams or web cams may be operated through a web cam provided with an Apple® computer or through Windows® or though any other type of operating system. Current websites fail to provide a means for all video into a single format instantly with the user having to purchase compatible equipment. In other instances, a user may wish to record live video and audio for sending to another user over email. Typically this means that the user must use a stand-alone computer program, usually supplied with the video camera, to record the video and audio, and save it as a separate file on the computer's hard disk drive. The user then must manually attach the file to an outgoing email, and hope that the recipient of the email has a computer with the capability to playback the file.

In all these situations, there are additional problems. If a purchaser of an online dating service wishes to record and submit a video, the purchaser must make sure they attach the video to email. The purchaser may not be sophisticated enough to save the recorded video and audio as a file, and may also not be sophisticated enough to manually attach the file to an outgoing email. In the case of complex email programs, such as versions of Microsoft Outlook available from Microsoft Corp. of Redmond, Wash., the user may not understand how the program works. Even if the user can perform all this functionality, the end user still may not have a program that can playback the file, and may not know how to obtain one easily. Furthermore, at best this entire process is laborious, which itself may cause users to send video and audio with their emails far less than they otherwise would.

The present invention is designed to overcome the problems of the prior art by providing a website that permits real time video operation user to user over the Internet despite different operating systems or programs.

SUMMARY OF THE INVENTION

An object of the present invention is to provide a web site for social networking in which users can share videos for potential dates with other users of the system.

An object of the present invention is to provide a user with a direct link to another user's video through the Internet.

Still another object of the present invention is to provide a system for presenting registered users with a chance to view videos of other users without downloading additional software programs.

Yet, another object of the present invention is to provide a web site for social networking in which users can share videos for potential dates with other users of the system.

An object of the present invention is to provide a user with a direct link to another user's video through the Internet with a code.

Still another object of the present invention is to provide a system for presenting registered users with a chance to view videos of other users upon registration and information on the user's operating system.

The present invention is directed to a video sharing network where a provider has a website with a database and a web server for receiving video from registered members of the video sharing network. During the registration process, a member is provided with an option of selecting one of a limited number of portable cellular devices for use with the video sharing network. When a member is given the option of viewing a video offered by another member, the member may select to view the offered video. Upon selection, the video is sent to the requested member in a format compatible to the requested member's portable cellular device based on the requested member's selection of a portable cellular devices provided on the registration form.

DETAILED DESCRIPTION OF THE DRAWINGS

DETAILED DESCRIPTION OF THE PREFERRED EMBODIMENTS

The present invention is directed to a video sharing network that offers anonymous voice communications and multimedia messaging (audio/video). The multimedia messaging makes it incredibly easy for registered members to send videos back and forth to each other without the need for special software or the know how to encode videos. All the registered member needs to have is an Internet connection, a webcam and an operating system that supports the webcam. The website can deliver multimedia messages to any device that supports video/audio playback.

Figure 1:
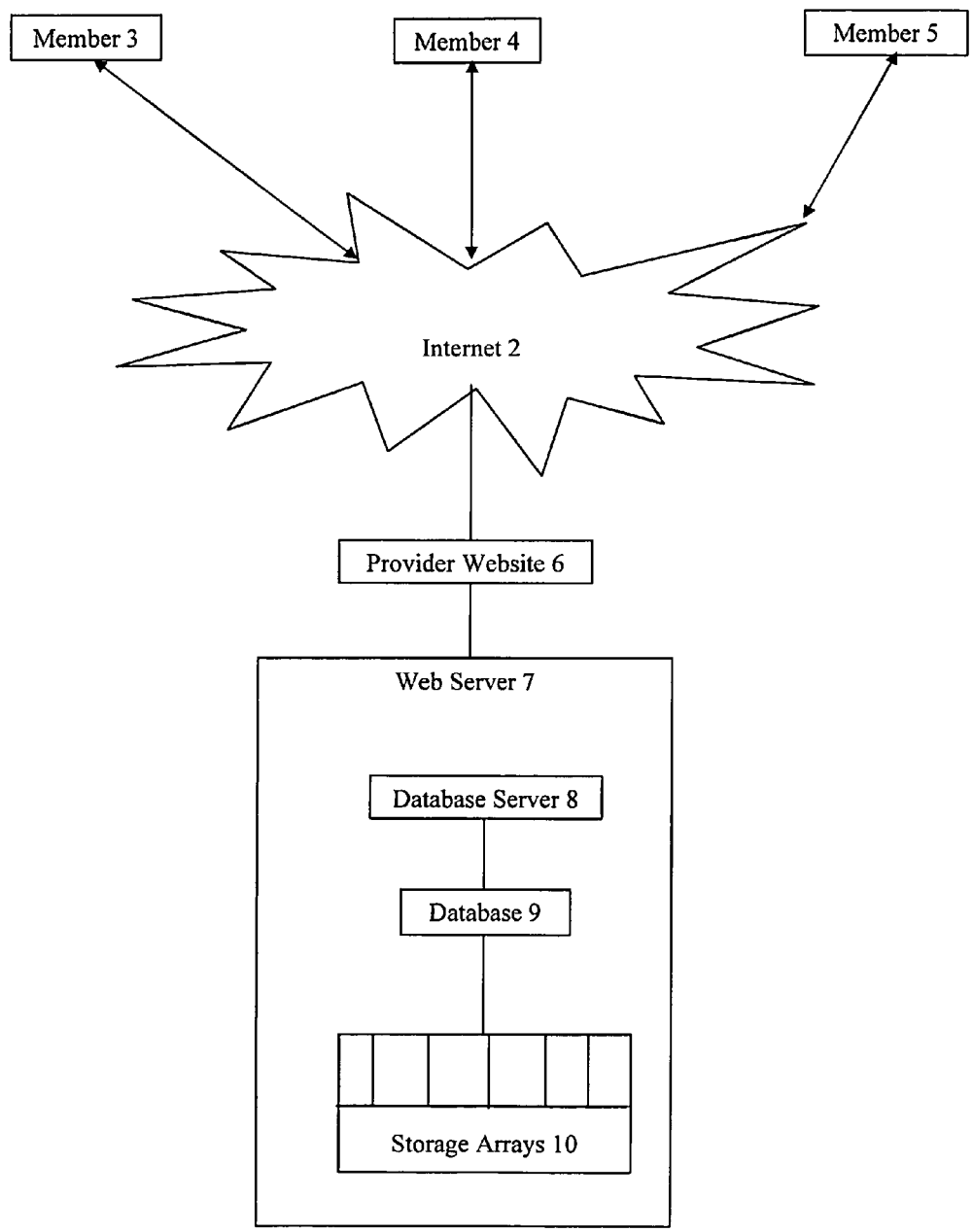
FIG. 1 is a schematic view of a video sharing network of the present invention.

As illustrated in FIG. 1, the present invention is directed to a video sharing network 1 which offers a video messaging process through the Internet 2 that provides recorded videos to registered recipient members 3-5. The video sharing network 1 provides an entertainment process in the form of a video created by a sending member for the purpose of sharing the video with other selected recipient members selected by a sending member. Videos are recorded through a provider's website 6 on a web server 7. The web server 7 includes a database 8, a database server 9 and a plurality of storage arrays 10.

Figure 2:
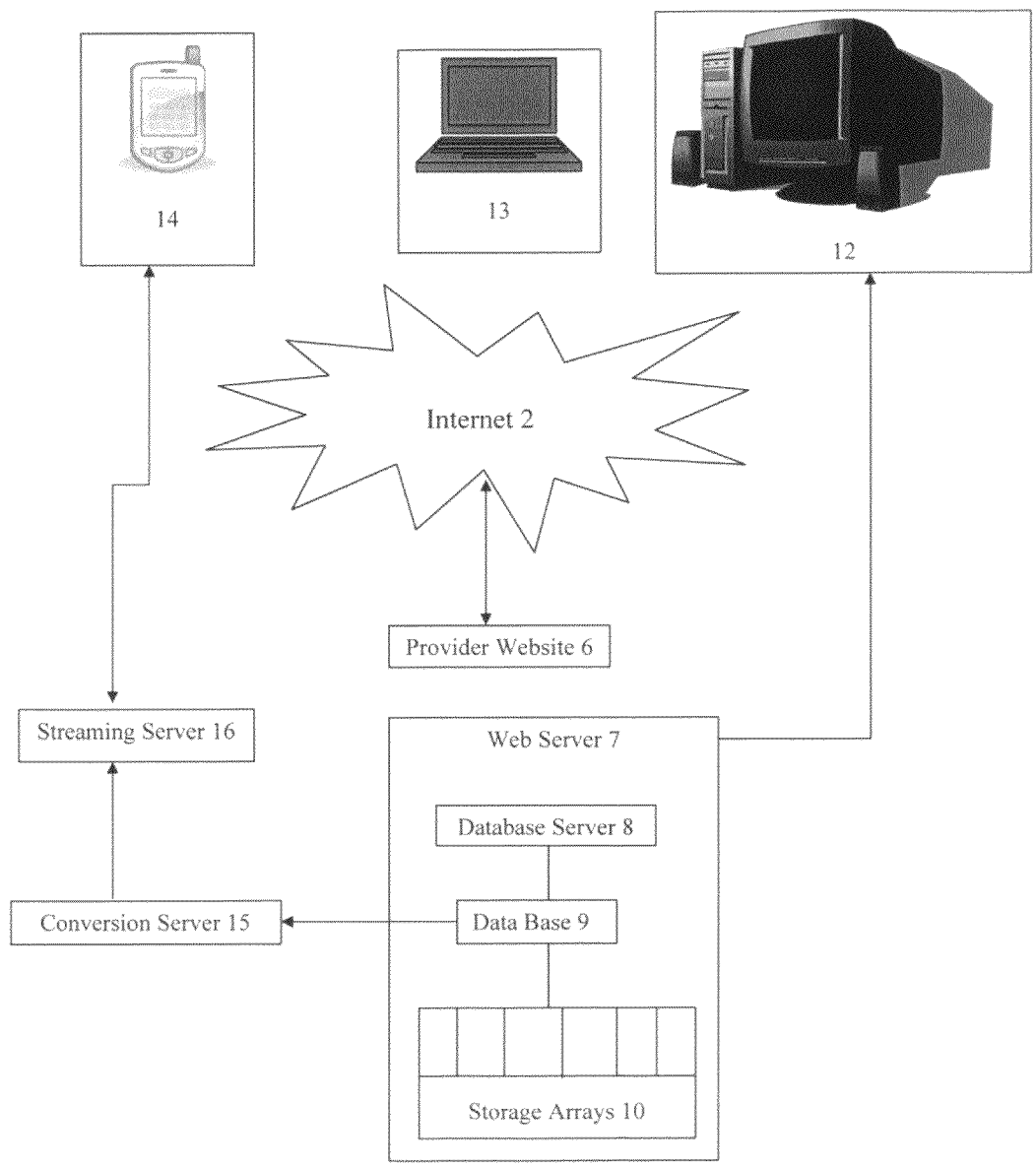
FIG. 2 is a detailed schematic view of a video sharing network of the present invention.

As shown in FIG. 2, the video sharing network 1 includes a number of registered member devices. The registered member devices may include a desktop computer 12, a laptop computer 13, or a portable media device such as an iPhone®, iPod® or iPad®, a Google Android®, or a Palm Pre®/Pixie® 14. In order to become a member, a user must go to a provider's website 6 and register. The provider's website 6 uses the web server 7 to collect the information from each new member in order to set up a video sharing process. This information from each member is stored in database 9. In order to transmit video to a portable media device 14, a conversion server 15 is provided in the video sharing network. The conversion server 15 sends formatted video to a streaming server 16 for transmission to portable media player 14.

Figure 3:
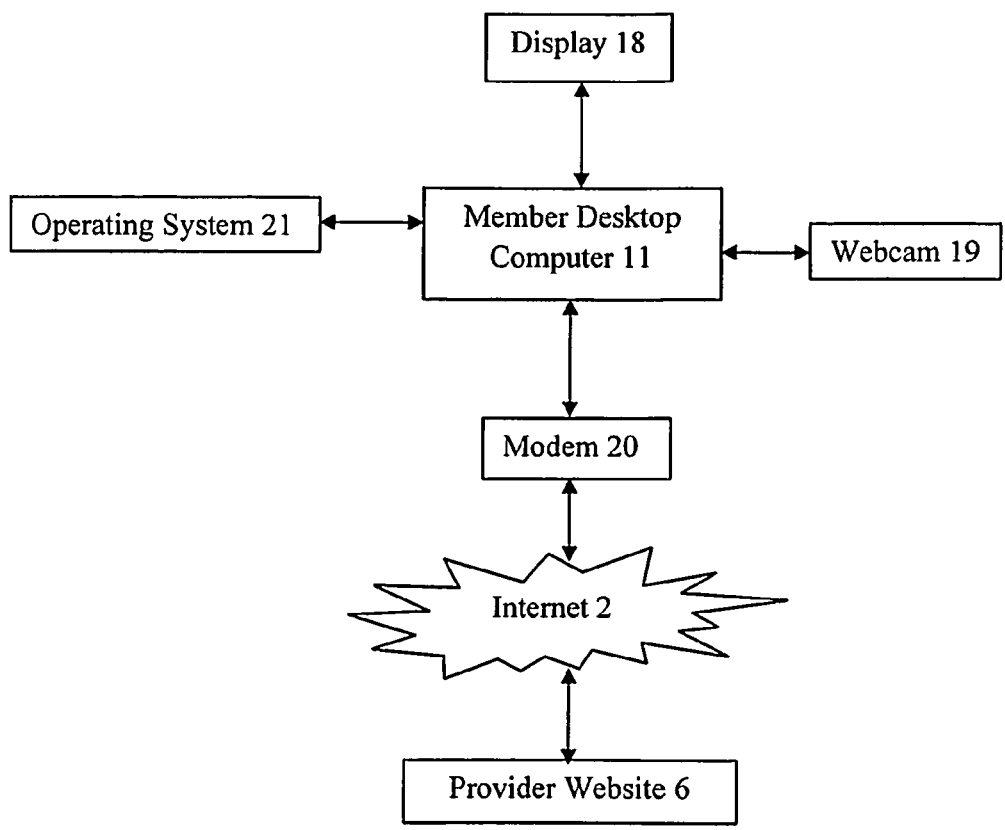
FIG. 3 is a schematic view of a computer system used to register onto the video sharing network of the present invention.

FIG. 3 is a schematic view of a typical computer system 17 used to register onto the provider's website 6. In order to sign up for the video sharing network 1, a user needs a desktop computer 12 along with a display 18 and a webcam 19. The computer needs a modem 20 for entering the Internet 2 and a specified operating system 21. FIG. 3 illustrates a standard set up for contacting the provider's website 6. After logging onto the Internet 2, the user can now go to the provider's website 6 for registration.

Figure 4:
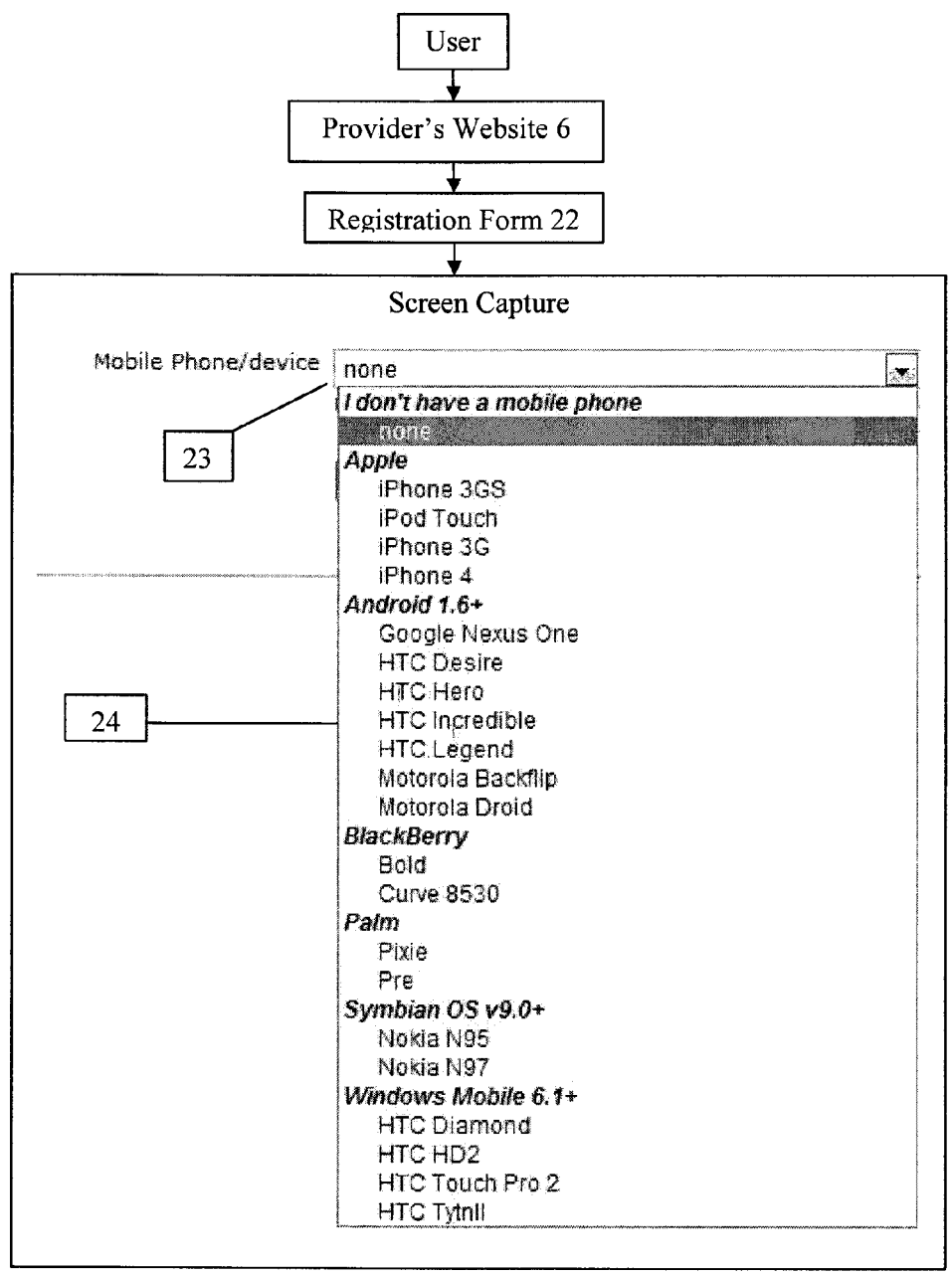
FIG. 4 is a schematic view of a registration form with a list of selectable portable media devices.

Once at the provider's website 6, a registration form 22 is offered to a user in order to register to become a member of the video sharing network 1. FIG. 4 The registration form 22 may be provided on the display 18 for entering information about the member. Also provided on the registration form 22 is means 23 for selecting a portable media device 14 from a list 24 of available portable media devices. The form may also provide a method of payment for provider's services from a list of credit cards. After the registration form 22 is completed and accepted by the provider, the member receives a password/code unique to the new member and used to log into the video sharing network 1. Once logged into the network, the member may email other members in the network for the purpose of sending video messages.

Figure 5:
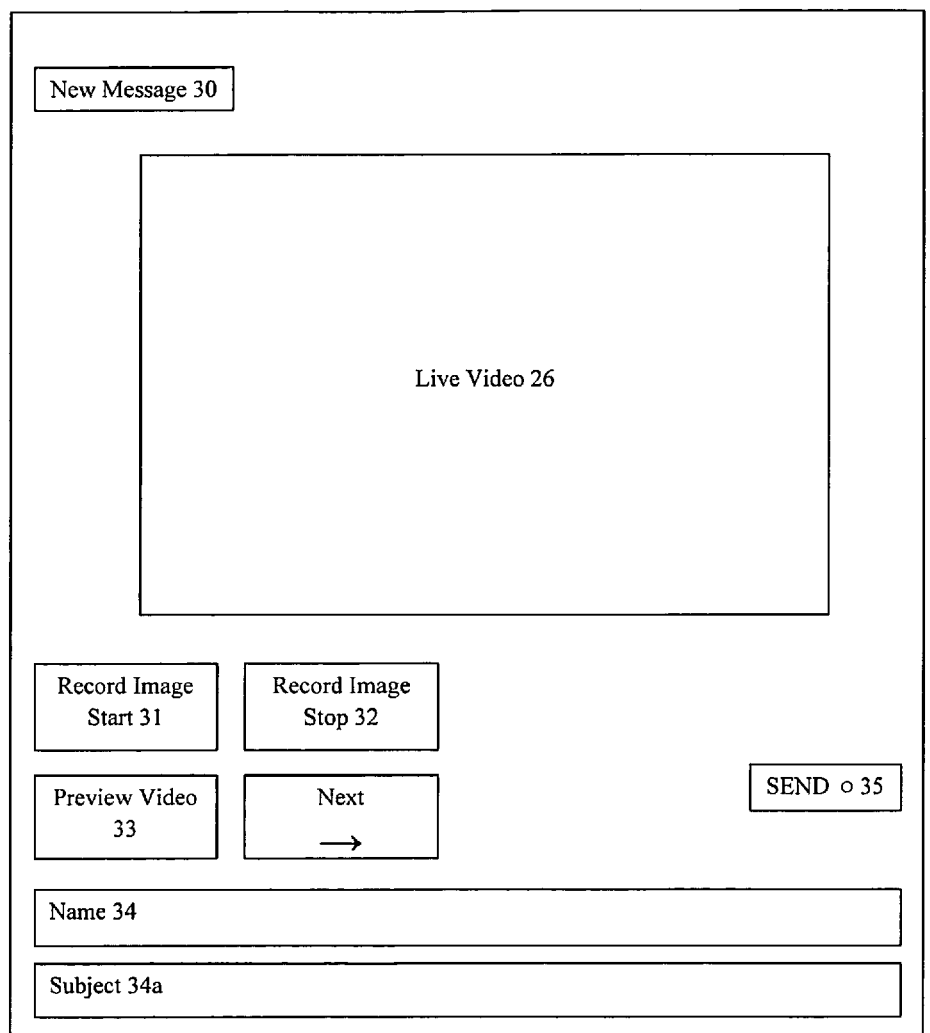
FIG. 5 is a screen shot view of a display screen depicting a video recording menu of a video sharing network of the present invention.

Once the new member is logged into the provider's website 6, the display 18 will indicate how to record a video on the provider's database 9. As shown in FIG. 5, a new message page 25 is offered to begin the recording process with a live video window 26 as shown in the center of the display 18. The sending member may begin the recording process by clicking on New Message icon 30 followed by the record the Record Image Start icon 31. After finishing the video, the recording is stopped by clicking on the Record Image Stop icon 32. The finished video may be previewed by clicking on the Preview Video icon 33. The completion of the video process may be achieved by typing in a recipient's name in the name section 34 and a subject in section 34*a*. The video may now be sent for storage on the database 9 by clicking the Send icon 35.

Figure 6:
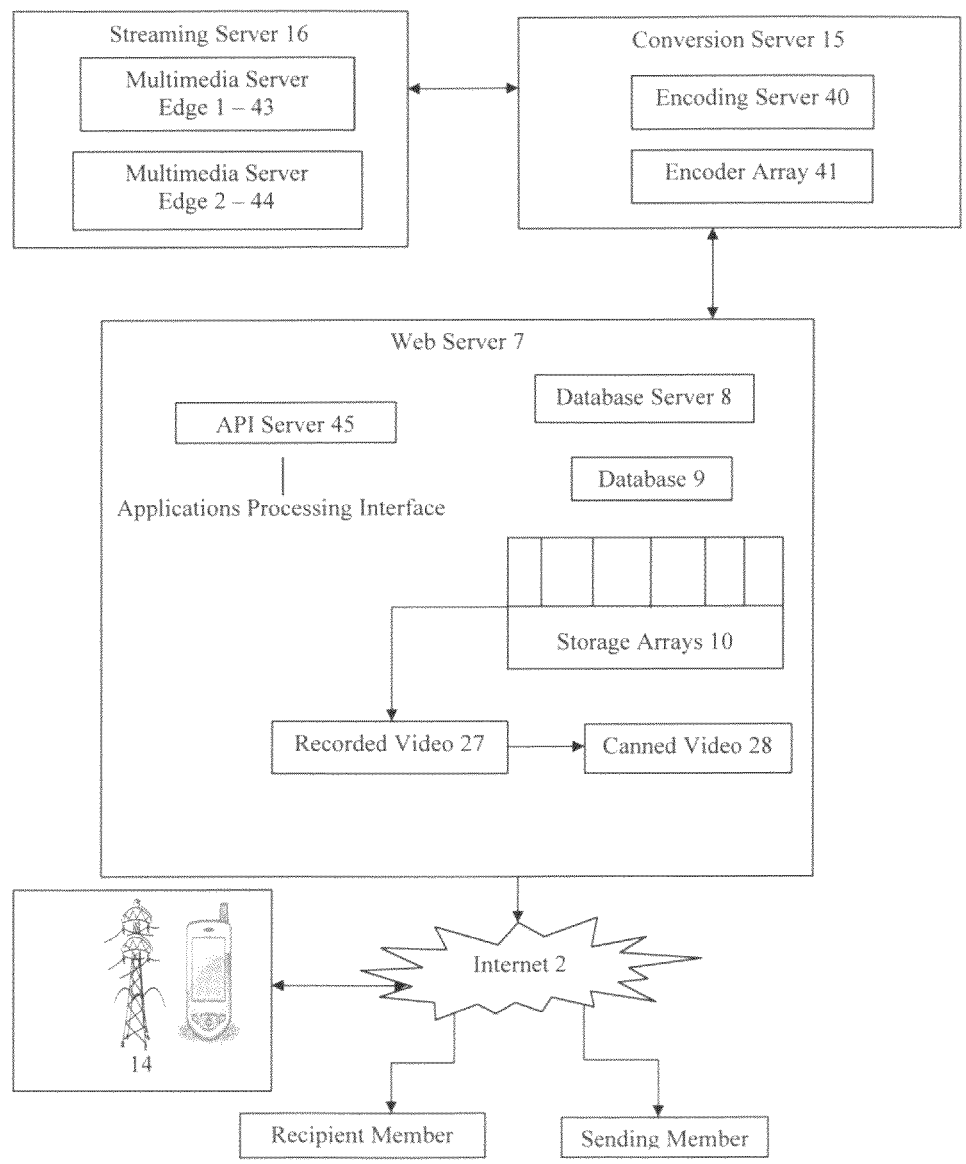
FIG. 6 is a schematic view of a video sharing network of the present invention.

FIG. 6 illustrates the video sharing network 1 including a system for converting video. In order to convert video for playback on a different operating system, the conversion server 15 is provided for supporting different playback codecs depending on the type of operating system. The conversion server 15 includes an encoding server 40 with an encoding array 41 with an application for detecting the type of device and encoding for the device based on the detected operating system. The encoder array 41 further permits the system to handle a large volume of tasks. The conversion server 15 is also provided with a playback code which allows various mobile and desktop devices to playback the videos through the website 6 and the streaming server 16. There may be more than one streaming server 15, such multiple streaming servers 43, 44 to keep the system operating a maximum speed. The web server 7 has an applications processing interface server 45 set up with redundancy for keeping the entire system operating together.

In operation, as the video is recorded from the user's desktop, the video is encoded by the system using flash format. FLV. Flash Format provides a canned file format that delivers video over the internet for use by a Flash player. The canned file 28 can be directly loaded into a Flash Player 7. On request by a recipient member, the system will look up a device variable formula in the database to see which device will be used for playback on the recipient's computer.

A device variable option provides a device options list in the database. Once the device is located, a list of variables unique to the selected device are sent to the conversion server 15. Once reviewed by the conversion server, a computer medium is used to convert the video base on the variables. The list of variables includes [1] a path (directory) used for the file location on remote server (/storage/video message/0-999/), [2] file name (example; some-file-name-to-convert.flv), [3] bit rate (bit rate used to stream the file for playback) low bit rate=poor quality; higher bit rate=higher quality etc.), [4] mobile device (numeric number representing a mobile device), [5] video ID (used for internal use), and [6] message ID (used for internal use).

Once these variables have been passed into another script located on a separate server, this spawns a computer medium to convert the video using the variables passed from the first system. Overall processing is as follows as those initial variables are passed into encoding server 40.

1.) encoding server copies the file remotely from the web or database server where it was initially recorded using the flash format.
2.) once the file has finished copying it will be converted to the format specified in one of the variables (device number).
3.) when conversion process completes the file will be copied back to the web or database server in the same location as the original.
4.) Error checks are now performed on the newly converted file. (does file exist etc).
5.) Once error checks have been completed the recipient is notified via email or SMS/email.

Figure 7:
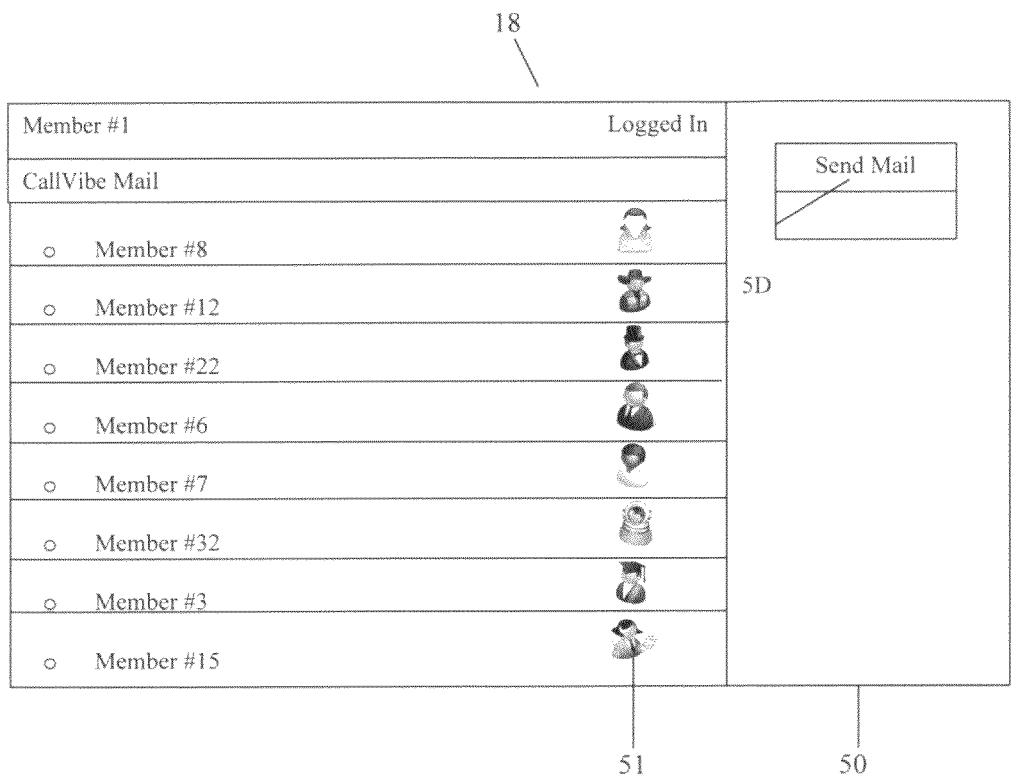
FIG. 7 is a screen shot view of a display screen depicting a new message page for the video sharing network.

After the sending member is logged into the video sharing network 1, the sending member may send a video message to any other recipient member using e-mail provided by the video sharing network 1. As depicted in FIG. 7, the computer display 18 shows a screen shot email window 50 the e-mail received by the recipient member along with a window 51 for sending mail. A picture display icon 52 is provided at incoming mail of each sending member. Accordingly, a potential recipient member may take an initial view of the sending member before opening e-mail sent by the sending member.

Figure 8:
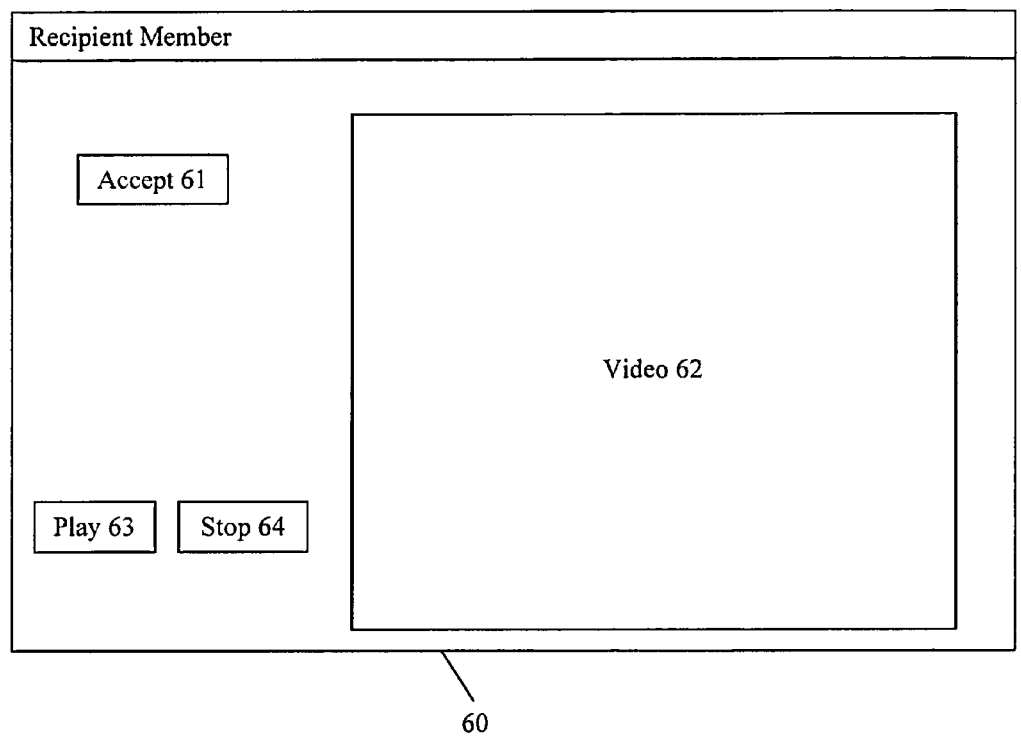
FIG. 8 is a screen shot view of a display screen depicting a video playback menu of a video sharing network.

Upon opening any e-mail provided with a video message, a screen shot 60 as depicted in FIG. 8 will appear on the recipient member's display 18. At that time, the recipient member may click on the accept icon 61 to launch the video sharing processing the video play window 62. When the video is ready for playback, Play icon 63 will illuminate. The recipient member may now click on the Play icon 63 for playback on the recipient's display 18. The Stop icon 64 permits the recipient member to stop play at any time. If the recipient member is using a portable media device 14, playback takes 15-20 seconds to begin playback. For playback on desktop computers, playback occurs in real time.

Example Scenario

Mike signed up to the website and selected his iPhone® for his mobile device along with SMS/email for default notifications. John sends Mike a two minute video message. The streaming media server records John's video/audio input from his webcam. Once recorded this file is in a standard video format. John enters "Mike" as the recipient. The system looks up the recipient to find out which mobile device Mike is using and his default notification method. Since Mike is using the iPhone®, the video is transcoded to stream to the iPhone®. Once the transcoding process has finished (within 30 seconds) Mike will receive a message on his iPhone® that he has a new video message. Mike now has the option of streaming the video directly to his iPhone® or viewing it at a later time from his workstation.

If the recipient of this sent message would prefer to playback the video on their Android mobile phone, the video is copied over the network by the web server 7 to the conversion server 15 that handles the conversion process. The video will be converted for playback and copied back to the web server 7 where the user will be able to stream it to their device. This total process takes less than two minutes.

Figure 9:
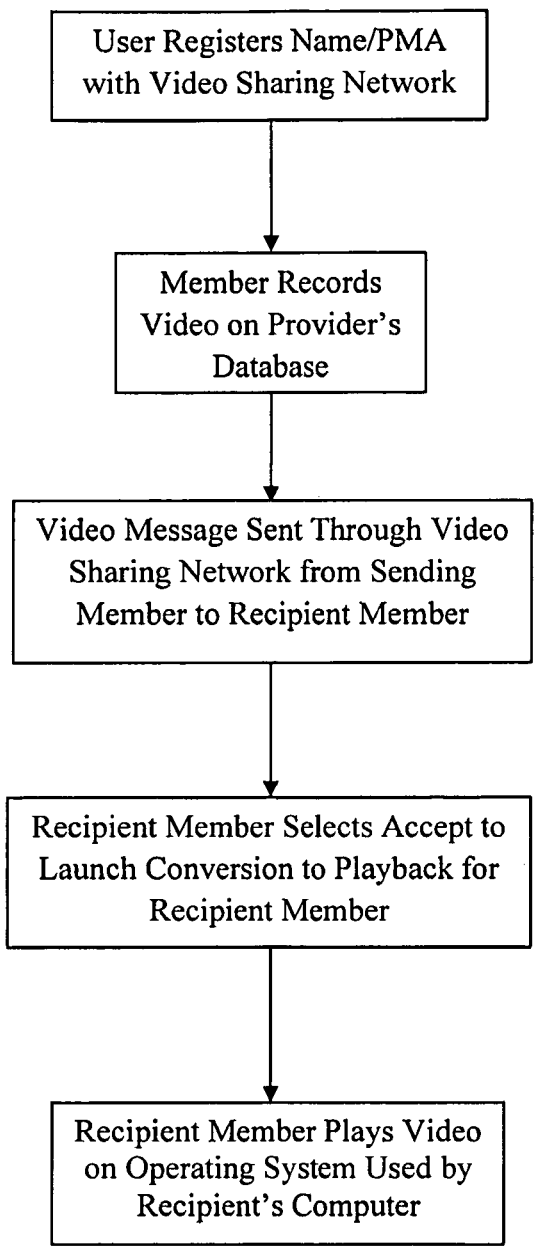
FIG. 9 is a flow diagram of a video sharing process of the present invention.

A flow diagram of the video sharing process is shown in FIG. 9. As shown, the video conversion process is launch when the recipient accepts to video the sending member video. The stored information regarding the operating system used by the recipient member's portable media device 14 permits the video to be played on the recipient member's portable media device 14.

The present invention is directed to a method of, providing a video sharing network by offering an application to a user to register for membership on a website. The application obtains the operating system format of said users computer and said user's webcam. As a result, the user receives an identification code unique to the user's account, computer and web cam operating system. An application is offered to a second user to register for membership on a website which also requests the operating system format of the second user's computer and web cam. As a result, the website provides the second user with an identification code unique to the user's account and web cam operation system Upon receiving an email with an attached video from the first user, the video is sent to a first server for storage and then to a conversion server. At the conversion server, the conversion server selects from a list of variables and the video is converted to another format which is compatible with the operating system of the second user's computer and web cam. According the second user can watch the video in real time on the request without resorting to additional downloads or software.

In operation, the video sharing network of the present invention incorporates a registration process with a near real time conversion process in order to present videos for playback with registered members of the video sharing network. Registration of a member's portable device along with a code unique to each member permits the video sharing network to convert and send a video for playback on any type of operating system. For desktop computers, the playback is in real time. For portable media devices 14, the playback occurs in less than 20 seconds.

The invention claimed is:

1. A method for producing, sending and displaying video over the Internet to a registered member of a website, said method comprising the following steps,
   providing a web server, said web server including a database, a database server and a plurality of storage arrays,
   offering a registration form to a first user, said registration form providing a means for the first user to select from a list of portable media devices, said user selecting a portable media device from said list and storing said information on a database and making payment on said registration form to join said video sharing network,
   accepting said registration form from said first user and providing said first user with a code for logging into said video sharing network,
   offering a registration form to a second user to join a video sharing network, said registration form providing a means for the second user to select from a list of portable media devices, said second user selecting a portable media device from said list for storage on a database and making payment on said registration form to join said video sharing network,
   accepting said registration form from said second user and providing said second user with a code for logging into said video sharing network,
   receiving and recording a video on said database produced by said first user for playback,
   receiving and recording a video on said database produced by said second user for playback,
   converting either of said videos for playback on said first users selected portable media device or said second user's portable media device based on said first users selected portable media device selected on said first user's registration form or based on said second users selected portable media device selected on said second user's registration form.

2. A method for producing, sending and displaying video over the internet to registered members of a website as recited in claim 1, said video sharing network further comprising, a web server for use with said database for storing said videos.

3. A method for producing, sending and displaying video over the internet to registered members of a website as recited in claim 1, said video sharing network further comprising a conversion server for converting said video for operation on a recipient member's database.

4. A method for producing, sending and displaying video over the interne to registered members of a website as recited in claim 1, said video sharing network further comprising a streaming server for sending video to portable media devices.

5. A method for producing, sending and displaying video over the internet to registered members of a website as recited in claim 1, said video sharing network further comprising, a storage array for storing videos.

6. A method for producing, sending and displaying video over the internet to registered members of a website as recited in claim 1, said video sharing network further comprising an encoding server for encoding recorded video.

* * * * *